United States Patent

[11] 3,569,913

[72] Inventor John C. Wolff Cheshire, Conn.
[21] Appl. No. 791,336
[22] Filed Jan. 15, 1969
[45] Patented Mar. 9, 1971
[73] Assignee The Whitney Blake Company New Haven, Conn.

[54] UNIVERSAL TELEPHONE HANDSET CORD
10 Claims, 10 Drawing Figs.

[52] U.S. Cl. .......... 339/103, 339/113
[51] Int. Cl. .......... H01r 13/58
[50] Field of Search .......... 339/101, 103—107, 113; 24/115; 179/100, 186

[56] References Cited

UNITED STATES PATENTS 3,315,040 4/1967 Brorein .......... 339/103X

FOREIGN PATENTS 740,695 1/1933 France .......... 339/103

OTHER REFERENCES

" Pressure Sensitive Wire Markers," North Shore Nameplate Inc. SM 101-10M-10-55

*Primary Examiner*—Ernest R. Purser
*Attorney*—Blair, Cesari & St. Onge

ABSTRACT: The universal telephone handset cord of the invention is adaptable for connection with telephones of different design. For use with a saddle-type handset the cord is provided with a removable sleeve for closing the handset cord opening, and one or more removable split ring washers which abut a saddle on the transmitter cup to secure the cord therein. To adapt the cord for use with a stayhook-type handset, the sleeve is removed leaving an underlying bushing to close the smaller cord opening in that type handset; also, the split ring washers which are not needed are removed. Connection with the screw in the handset is made with a stayhook secured to the end of the cord. The cord may also be provided with alternate schemes of color coding for the various telephone designs. This is done by coding the wires of the cord overall in one scheme and then superimposing a second color code scheme over portions of the wires in a manner which leaves the underlying scheme still visible.

INVENTOR.
John C. Wolff
BY
Blair Cesari and St. Onge
ATTORNEYS.

Patented March 9, 1971

3,569,913

2 Sheets-Sheet 2

INVENTOR.
John C. Wolff

BY

Blair Cesari and St. Onge
ATTORNEYS.

UNIVERSAL TELEPHONE HANDSET CORD

BACKGROUND OF THE INVENTION

Telephone handsets are produced by several manufacturers in a variety of sizes and styles to suit the varying needs and tastes of individual subscribers. The variety, however, creates a problem for telephone parts manufacturers and distributors who must maintain inventories of items for the various phones, and for telephone installers and repairmen who must be equipped with the parts to fit each type of phone they are likely to encounter in their work. Although each telephone manufacturer has to some extent standardized many of the parts in his telephone line, significant variations still exist between different manufacturers.

One part which has not been interchangeable is the telephone handset cord, that is the cord connecting the handset to the telephone base. This cord is generally connected into the handset through an opening in the transmitter end. One factor preventing interchangeability is that the opening should be substantially closed by the cord to insure that the acoustical performance of the transmitter is according to design. The diameter of the cord opening, however, differs significantly in telephones made by different manufacturers. In addition, the cord is secured within the handset in a manner to take the strain off the electrical contacts and prevent breakage when the cord is stretched or tugged. At the same time, the cord is secured against being accidentally pulled out of the handset. However, the specific manner of securing the cord also varies for telephones of different manufacturers.

Because of these design differences, telephone parts manufacturers and distributors have had to produce and/or maintain an inventory of several types of cords. This has meant duplication of production and storage facilities with attendant inconvenience and increased cost. The problem has been compounded in recent years with the advent of and increased popularity of colored telephones; this development has meant further duplication particularly of inventories which must now be maintained for numerous colors of each cord type.

Accordingly, representative objects of the present invention are to provide a telephone handset cord which is universally adaptable for connection to telephones made by a number of manufacturers, and which is simply constructed, easily installed, reliable and inexpensive.

Other objects of the invention will in part be obvious and will in part appear hereinafter.

The invention accordingly, comprises an article of manufacture possessing the features, properties, and the relation of elements which will be exemplified in the article hereinafter described, and the scope of the invention will be indicated in the claims.

SUMMARY OF THE INVENTION

The universal telephone handset cord of the invention may be either a straight cord or one of the increasingly used helically coiled retractile types; it is constructed to overcome the problems in production and inventory posed by the need for different cord constructions to fit telephone handsets made by different manufacturers.

Of the phones in general use in the United States today, there are two basic handset designs with regard to the attachment of the handset cord. These are typified, for example, by the handsets of Western Electric Company and Automatic Electric Company. For purposes of the present discussion the two general types of handset construction will be referred to hereinafter as a saddle-type (e.g., Western Electric) and a stayhook-type (e.g., Automatic Electric).

To accommodate the cord of the invention to a stayhook-type handset, it is provided with a flexible bushing adjacent one end. This bushing acts as a flex relief, that is, it permits the cord to be repeatedly flexed in use where it protrudes from the handset without damage to the underlying cord structure. The cord enters the handset through a handset cord opening adjacent the transmitter end and the bushing serves to close the opening so that the transmitter recess is closed off and design acoustical characteristics are maintained in the transmitter. A stayhook mounted on the end of the cord is secured within the transmitter recess by a screw which clamps the stayhook against the transmitter recess wall. In this way the cord is securely fixed against accidental separation from the handset. In addition, the stayhook absorbs any shock due to tugging or pulling on the cord and thus minimizes the danger of accidentally disconnecting the electrical terminals in the handset.

For attachment to a saddle-type handset, the cord is further provided with a removable flexible sleeve which telescopes tightly over the bushing. The purpose of the sleeve is to close the cord opening, which is generally larger in saddle-type handsets than in the stayhook-type, while maintaining the desirable degree of flex relief. In saddle-type handsets the cord is held by a transmitter cup saddle rather than by a screw. The saddle is a bifurcated member depending from the removable transmitter cup which holds the transmitter element in the handset, and which straddles the cord within the handset. Washers wider than the width of separation of the saddle legs are removably mounted around the cord between the point where straddling occurs and the cord end. Means are also provided to prevent the washers from slipping axially off the end of the cord. The saddle thus interacts with the washers within the handset to prevent the cord from pulling loose, and also to relieve the electrical contacts from strain.

The saddle- and screw-type handsets in common use further differ in the schemes of color coding employed for electrical connections. To make the cord of the invention compatible with both types, the electrical wires thereof are first fully color coded in accordance with one of the schemes. Then, they are additionally color coded in accordance with the other scheme by the application of colored sleeves over portions of at least some of the wires. The colored sleeves are limited in length so as not to obscure the underlying color code scheme. Thus, both schemes remain fully visible to guide any installer or repairman.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DESCRIPTION OF THE PREFERRED EMBODIMENTS

Figure 1:
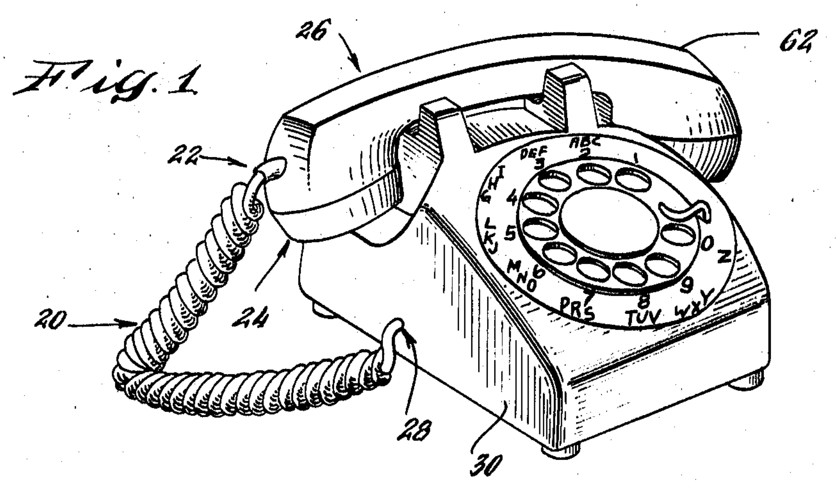
FIG. 1 is a front perspective view of a telephone in which the handset and base are connected by a retractile cord in accordance with the invention.
Figure 2:
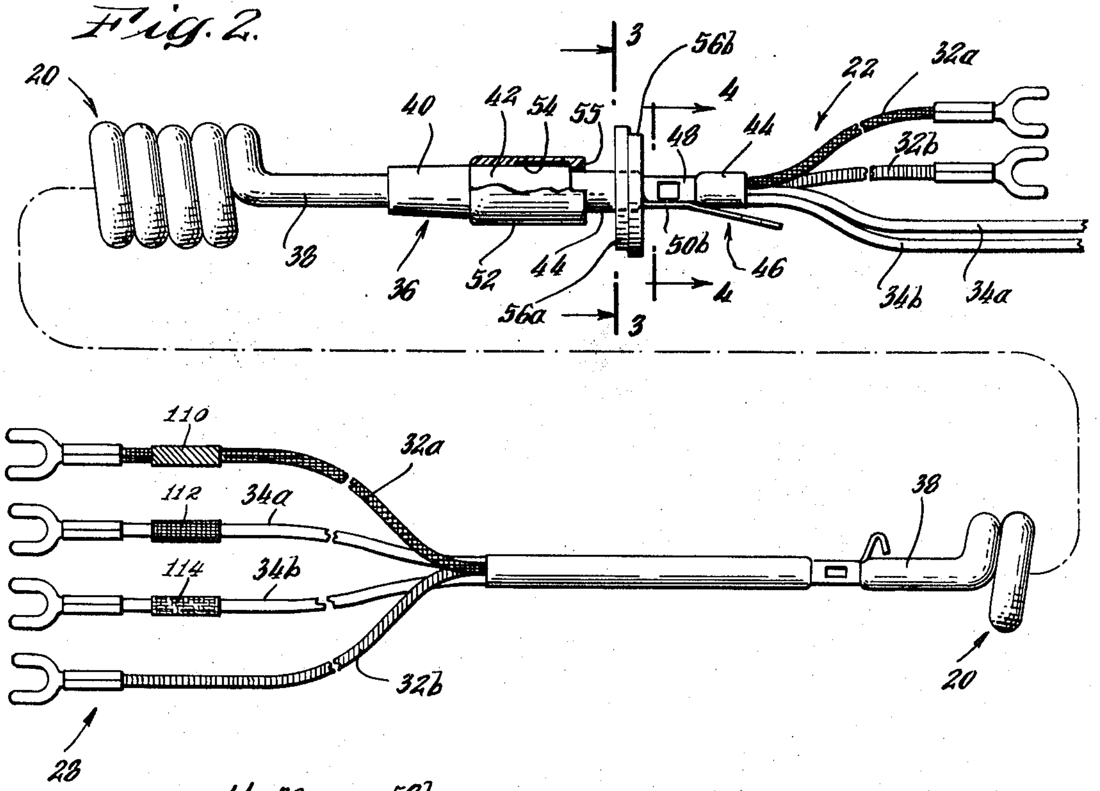
FIG. 2 is an enlarged view of the telephone handset cord of the invention showing the structure at either end.

Referring to FIGS. 1 and 2 there is shown a telephone handset cord 20 of the retractile type in accordance with the invention. One end 22 of cord 20 connects into the transmitter end 24 of a telephone handset 26, and the other end 28 connects into the telephone base 30. As shown in FIG. 2, end 22 has four free wires arranged in pairs 32a and 32b and 34a and 34b protruding from the interior of the cord structure. Wires 32a and 32b are for connection with the transmitter element of the handset, while wires 34a and 34b connect with the receiver element.

A flexible bushing 36 is mounted on end 22 over the outer insulating jacket 38 of cord 20. Bushing 36 may be at least in part secured to cord 20 by adhesive, or may be bonded by a heat treatment. Alternately it may be integrally formed on jacket 38. Bushing 36 has a tapered flexible end 40 which permits considerable flexing of cord 20 in use, but which prevents sharp bends adjacent the handset which may lead to chafing and eventual cord rupture or to reduced flex life of the cord conductors. It also has a central cylindrical portion 42 with a diameter which will substantially close the handset cord opening in one type of telephone as is more fully discussed below. The other end 44 of bushing 36 is in the form of a necked-down tube extending over cord jacket 38 in the direction of the wire pairs 32 and 34.

Figure 4:
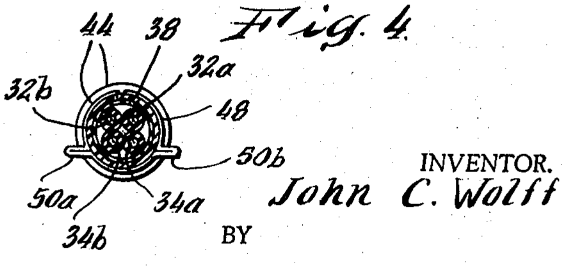
FIG. 4 is an enlarged sectional view taken along line 4–4 of FIG. 2.

A stayhook 46 (FIGS. 2 and 8) is secured to the end of cord 20 between bushing 36 and the wire pairs 32 and 34. Stayhook 46 may be formed of metal and is preferably secured by having one end 48 crimped about the end of cord 20 and at least in part over necked-down tube 44 to further secure bushing 36 to cord 20. As shown in FIG. 4, the crimped end 48 of stayhook 46 is preferably provided with a pair of crimped shoulders 50a and 50b which extend laterally to a greater diameter than tube 44. Alternatively, shoulders 50a and 50b can be a preformed part of end 48.

Referring back to FIG. 2, a removable sleeve 52 is provided over bushing 36 and overlies the central cylindrical portion 42 thereof. The outer diameter of sleeve 52 is matched to the larger diameter cord opening in a saddle-type handset design which cannot be closed by bushing 36 alone. The inner diameter of sleeve 52 is correlated with the outer diameter of portion 42 to provide a tight-gripping fit. The fit should be tight enough to insure that sleeve 52 will remain in place and only be removed through conscious effort on the part of a telephone installer, repairman or the like. The inner surface of sleeve 52 is preferably provided with a relieved portion 54 to facilitate its sliding removal from bushing 36 and to maintain the flex relief characteristics of the assembly. Relieved portion 54 also provides a flanged end 55 on sleeve 52 which cooperates with the end of bushing 36 as shown in FIG. 2 to prevent sleeve 52 from accidentally sliding off to the left. Sleeve 52 will generally be made of the same flexible material as bushing 36; they both, for example, may be made from polyvinylchloride (PVC) or a similar material.

Figure 3:
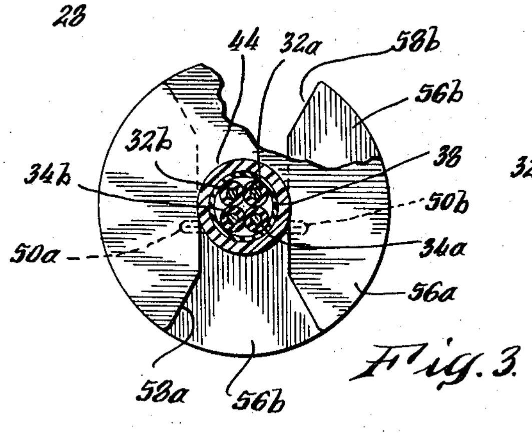
FIG. 3 is an enlarged sectional view, partly broken away, taken along line 3–3 of FIG. 2.

There is further provided on cord 20, between sleeve 52 and stayhook 46, at least one, and preferably a pair of slotted ring washers 56a and 56b made of any relatively stiff material such as polyethylene, polypropylene, nylon or the like. As shown in FIG. 3, each washer 56a and 56b is provided with a keyhole-shaped slot 58a, 58b having a width $w$ which will provide a resilient sliding fit over the tube 44 of bushing 36. When two washers are used, they are preferably mounted (FIG. 3) with their respective slots 58a and 58b oppositely directed on tube 44 to provide an optimally rigid abutment structure. As shown, washers 56a and 56b are prevented from sliding off the end of cord 20 through contact with the protruding shoulders 50a and 50b on the crimped portion 48 of stayhook 46 (FIGS. 2 and 3). Alternatively, the abutment structure may be provided as an enlarged diameter integral with either bushing 36 or end 48 of stayhook 46.

Figure 5:
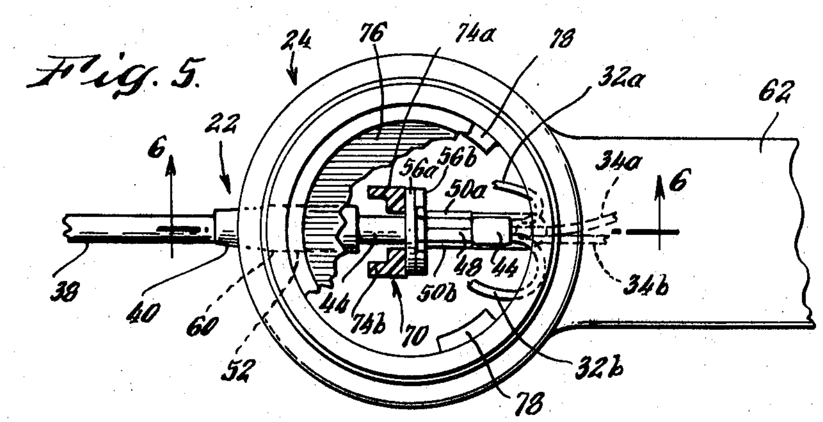
FIG. 5 is a top plan view shown partly in section of the transmitter end of a saddle-type telephone handset with the cord of the invention connected thereto.
Figure 7:
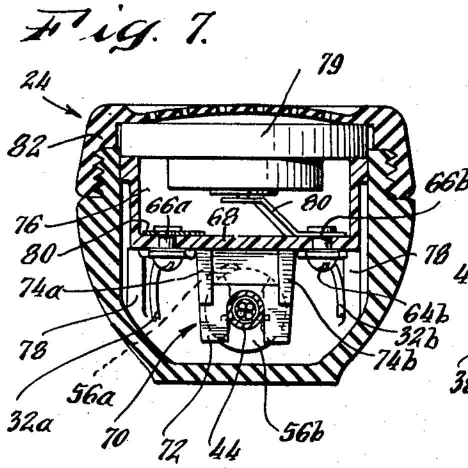
FIG. 7 is a sectional view taken along line 7–7 of FIG. 6.
Figure 6:
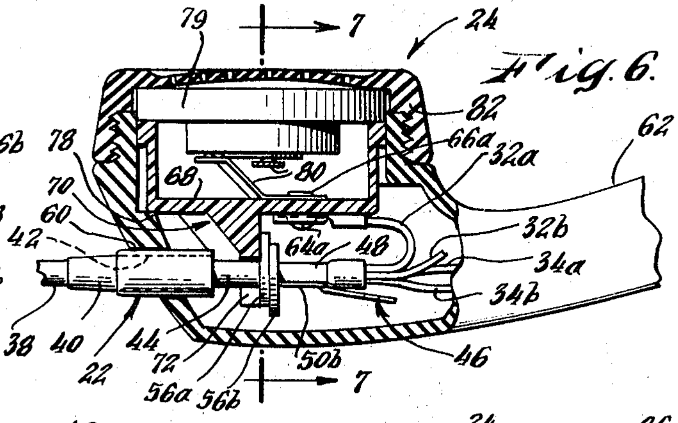
FIG. 6 is a sectional view taken along line 6–6 of FIG. 5.

The end 22 of cord 20 as illustrated in FIG. 2 and described above is adapted for connection with a saddle-type telephone handset. Referring to FIGS. 5—7, there is shown the transmitter end 24 of a saddle-type telephone handset. Cord end 22 is inserted through the cord opening 60 until it is substantially closed by sleeve 52. Washers 56a and 56b are conveniently removed until end 22 is inserted and are then replaced. Wires 34a and 34b are pushed through the handset handle 62 for connection with a receiver element (not shown) at the other end. Wires 32a and 32b are connected respectively to terminal posts 66a and 66b (FIG. 7) on a separate transmitter cup 68 by screws 64a and 64b.

Depending from the base of transmitter cup 68 is a saddle 70 comprising a dependent flange 72 having a bifurcated end (FIG. 7) adapted to straddle cord end 22 over the necked-down tube 44 of bushing 36. Saddle 70 is reinforced by a pair of side flanges 74a and 74b which are spaced from cord 22 (FIG. 7) to avoid interference upon assembly.

In order to firmly secure cord 20 within handset 26, transmitter cup 68 is placed into the transmitter cup recess 76 where it is supported on ledges 78 (FIG. 5) projecting from the recess wall. The bifurcated end 72 of saddle 70 is slipped over bushing tube 44 (FIG. 6) and abuts against washers 56a and 56b. The combined abutting action between saddle 70, washers 56a and 56b and shoulders 50a and 50b acts to secure cord 20 against being pulled out of handset 26. The larger central portion 42 of bushing 36 also abuts against the front of saddle 70 to prevent cord 20 from being pushed into the handset. The assembly thus provides a secure, but somewhat resilient mounting for the cord which guards against its accidental separation from the handset and also serves to prevent stresses on the electrical connections to terminal posts 66a and 66b. To complete the assembly of the handset, a transmitter element 78 is placed in the top of cup 68 in contact with one or more contact arms 80, and a perforated transmitter cap 82 is screwed into place to secure the entire assembly.

Figure 8:
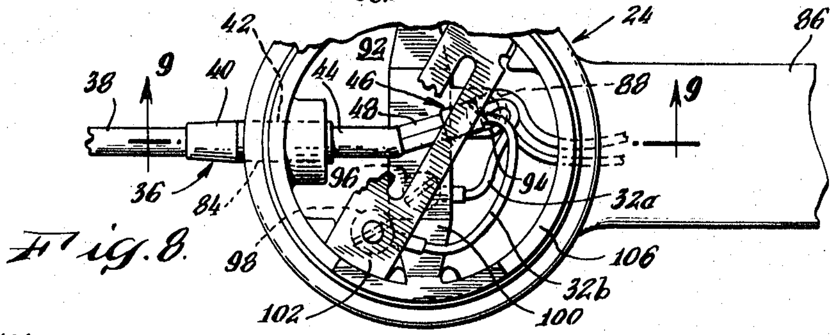
FIG. 8 is a top plan view, partly broken away, of the transmitter end of a stayhook-type telephone handset with the cord of the invention connected thereto.
Figure 10:
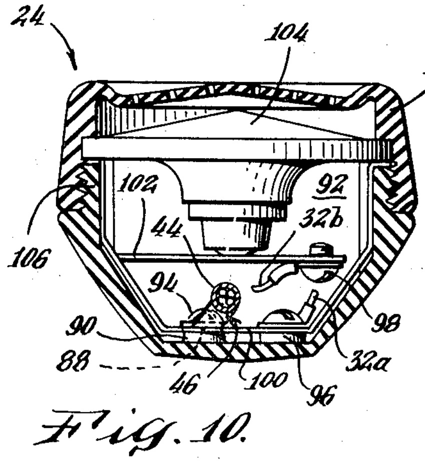
FIG. 10 is a sectional view taken along line 10–10 of FIG. 9.
Figure 9:
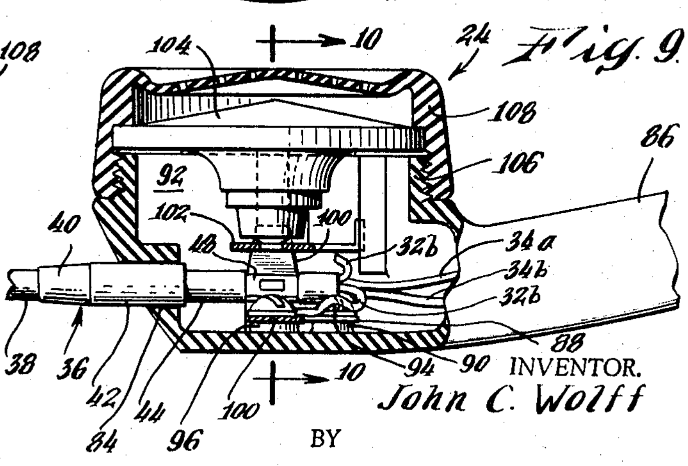
FIG. 9 is a sectional view taken along line 9–9 of FIG. 8.

Referring now to FIGS. 8—10, there is shown a stayhook-type telephone handset. To adapt the cord 20 for use in such a handset, washers 56a and 56b are removed, and sleeve 52 is pulled off bushing 36 and removed from the cord. The end 22 of cord 20 then appears as shown in FIG. 8. End 22 is inserted into the cord opening 84 in the transmitter end 24 of the handset until the central cylindrical portion 42 of bushing 36 substantially closes the smaller diameter cord opening 84 in this type handset. Wires 34a and 34b are threaded through handle 86 to connect with a receiver element (not shown) at the opposite end.

As shown in FIGS. 9 and 10, cord 20 is held within the stayhook-type handset by securing the front hooked portion 88 of stayhook 46 to a screw 94 in a post 90 extending from the base of the transmitter recess 92. Wires 32a and 32b are then respectively connected to terminals 96 and 98 (FIG. 8) on a pair of contact bars 100 and 102 mounted transversely in recess 92. Thus, there is also provided means for mounting the cord of the invention in a stayhook-type handset to effectively prevent accidental separation and to cushion the electrical connections from strain. The assembly of the stayhook-type handset is completed by placing a transmitter element 104 in recess 92 where it is supported on flanges 106 in contact with bar 102. The assembly is secured by screwing down a perforated transmitter cap 108 thereover.

Another factor which has made it difficult to interchangeably use handset cords on telephones of different manufacturers is that different color-coding schemes for electrical connections are used by the various manufacturers. To overcome this problem the individual wires of the cord of the invention are first color coded overall in accordance with one scheme; for example, the wires may be coated with various colors of insulation or they are given bands or stripes of color to distinguish one from the other. Referring back to FIG. 2, wires 34a and 34b are shown coded with white insulation while wires 32a and 32b are respectively coded with black and red insulation. To adapt the cord for use with another color-coding scheme, means are provided on the wires to superimpose the second color-coding scheme over the first; these means may be provided both on the end 22 which connects with the handset 26 and on the end 28 which connects with the telephone base 30. However, the difference in length between wire pairs 32 and 34 on end 22 (FIG. 2) is ordinarily sufficient to make the distinction for connection to the transmitter and receiver elements and either wire of each pair may be connected to either side of its corresponding element. Accordingly, the second color code scheme need only be applied to cord end 28 which is to be connected with the telephone base 30 as shown in FIG. 1.

Referring to FIG. 2, identification members 110, 112 and 114, colored in accordance with a second color code scheme, are respectively placed on wires 32*a*, 34*a* and 34*b*. Members 110, 112 and 114 may be applied by any suitable color-coding technique; for example, they may be stripes or bands of color applied by painting or by spraying, or they may be areas of differently colored insulation. Preferably, however, they are sleeves of heat-shrinkable material placed over the wire ends and shrunk in position. As shown, sleeves of green, black and yellow have been applied respectively to wires 32*a*, 34*a* and 34*b*. Wire 32*b* which was originally red has been left without a separate sleeve since it is also red in the second color code scheme illustrated. In this way, through the use of sleeves on one or more wires, any variety of alternate color code schemes may be superimposed on the original. It will be noted, however, that the extent of coverage of the sleeve should be limited so that both the original and superimposed color code schemes are fully visible.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

I claim:

1. A universal telephone handset cord having means at one end for connection with a variety of handsets comprising:

A. a bushing having at least a portion with a diameter which will substantially close a first size handset cord opening;

B. a removable sleeve secured on said end over said bushing, said sleeve being of a larger diameter than said bushing portion to substantially close a second larger size handset cord opening;

C. a stayhook mounted on said end spaced from said bushing portion for securing said cord to a stayhook-type telephone handset; and D. abutment means between said removable sleeve and the hook portion of said stayhook forming an enlarged diameter on said end for cooperating with the transmitter cup saddle of a saddle-type telephone handset to secure said cord thereto.

2. A universal telephone handset cord as defined in claim 1 wherein said abutment means comprises at least one washer removably mounted on said end between said bushing portion and said stayhook, and means securing said washer against axial slippage off the end of said cord.

3. A universal telephone handset cord as defined in claim 2 wherein said washer is of the slotted ring type and is resiliently mounted over said end between said bushing portion and said stayhook, and including shoulders on a portion of said stayhook to prevent axial slippage of said washer off the end of said cord.

4. A universal telephone handset cord as defined in claim 3 having two said slotted ring washers mounted resiliently over said end with the open ends thereof substantially oppositely directed.

5. A universal telephone handset cord as defined in claim 1 wherein the wires thereof are color coded in accordance with one scheme and including identification means which superimpose a second scheme of color coding on at least the wires at the end of said cord which connects with a telephone base.

6. A universal telephone handset cord as defined in claim 5 wherein said identification means comprise one or more lengths of tubing colored in accordance with said second scheme secured about at least some of said wires which connect said cord with a telephone base, said lengths of tubing being limited in length so as not to completely obscure the color code scheme of the underlying wires.

7. A universal telephone handset cord as defined in claim 6 wherein said lengths of tubing are of heat-shrinkable material.

8. A universal telephone handset cord as defined in claim 1 wherein said cord is of the retractile type.

9. A universal telephone handset cord having means at one end for connection with a variety of handsets comprising:

A. a bushing having at least a portion with a diameter which will substantially close a first size handset cord opening;

B. a removable sleeve frictionally mounted over said bushing, said sleeve being of a larger diameter than said bushing portion to substantially close a second larger size handset cord opening;

C. a stayhook secured on said end spaced from said bushing portion for securing said cord to a stayhook-type telephone handset;

D. at least one slotted ring washer resiliently mounted on said end between said bushing portion and said stayhook, said washer being of a diameter to cooperate with the transmitter cup saddle of a saddle-type telephone handset to secure said cord thereto; and E. means on said stayhook to prevent axial slippage of said washer off the end of said cord.

10. A universal telephone handset cord as defined in claim 9 wherein the wires thereof are color coded in accordance with one scheme and including identification means colored in accordance with a second scheme of color coding secured to at least some of the wires at the end of said cord which connects with a telephone base, said identification means being limited in their extent of coverage of said wires so as not to completely obscure the underlying color code scheme.